United States Patent [19]

Jacques et al.

[11] Patent Number: 5,042,749
[45] Date of Patent: Aug. 27, 1991

[54] MECHANISM FOR LIMITING ROTATION OF A ROTATABLY MOUNTED SHAFT

[75] Inventors: David L. Jacques, Rockford; Gary L. Sasscer, Leaf River, both of Ill.

[73] Assignee: Sundstrand Corporation, Rockford, Ill.

[21] Appl. No.: 506,821

[22] Filed: Apr. 10, 1990

[51] Int. Cl.⁵ .............................................. B64C 3/14
[52] U.S. Cl. ..................................... 244/49; 244/224; 244/75 R; 74/411.5; 74/421 R; 192/12 R; 403/359
[58] Field of Search ............... 244/75 R, 49, 221, 224; 74/411.5, 813 L, 814, 606 R, 7 A, 421 R; 475/900; 192/12 R, 67 R; 403/1, 359

[56] References Cited

U.S. PATENT DOCUMENTS

| | | | |
|---|---|---|---|
| 3,469,806 | 9/1969 | Olchawa | 74/411.5 |
| 3,813,958 | 6/1974 | Meyer | 74/411.5 |
| 4,408,746 | 10/1983 | Marsch et al. | 475/900 |
| 4,503,899 | 3/1985 | Forquer | 74/411.5 |
| 4,823,633 | 4/1989 | Pike | 74/411.5 |
| 4,827,787 | 5/1989 | Gillingham et al. | 74/411.5 |

Primary Examiner—Galen Barefoot
Attorney, Agent, or Firm—Antonelli, Terry, Stout & Kraus

[57] ABSTRACT

A mechanism (10) for limiting rotation of a rotatably mounted first shaft (12) in accordance with the invention includes a housing (28) in which the first shaft is rotatably supported; a torque input (14) coupled to the first shaft; and a torque output (18) coupled to the first shaft; a second shaft (30) rotatably supported by the housing and movable between a first axial position in which the second shaft does not engage the first shaft and a second axial position in which the second shaft engages the first shaft; at least one member (32) attached to the second shaft which projects radially from the second shaft; and the housing having an inner cavity (42) with at least one surface (70) which engages the at least one member which projects radially at first and second angular positions of the shafts to provide for a limited degree of angular rotation of the shafts when the second shaft is in the second axial position.

30 Claims, 3 Drawing Sheets 5,042,749

MECHANISM FOR LIMITING ROTATION OF A ROTATABLY MOUNTED SHAFT

DESCRIPTION

1. Technical Field

The present invention relates to devices for limiting rotation of a shaft to disable driving of the shaft by a power source.

2. Background Art

Rotatably mounted shafts are utilized in a wide range of applications in which torque is applied from a power source through the shaft to a driven element. There are many applications in which it is desirable to limit the rotation of a driven shaft to permit maintenance or other procedures to be performed on the system containing the shaft. Injury could result to service personnel if the power source is inadvertently activated during the performing of a maintenance procedure on a system in which a movable element is driven by the shaft.

U.S. Pat. No. 4,827,787, which is assigned to the Assignee of the present invention, discloses a mechanical transmission locking mechanism for locking a shaft which is driven by a power source to permit maintenance or other procedures to be performed on the system in which the shaft is contained such as on a cargo door of an airframe. The shaft locking mechanism disclosed in the '787 patent provides for positive locking of the shaft in a fixed rotary position by engaging teeth of a worm gear with another gear which is grounded to the system housing. A lost motion device is provided between the worm gear and the shaft on which it is mounted to provide limited rotation between the rotatably mounted shaft and the worm gear and a cam is provided accommodating limited axial movement of the worm gear relative to the shaft so that the teeth of the gear grounded to the housing are automatically aligned during rotation of the shaft to accomplish meshing of the teeth of the worm gear with the gear grounded to the housing.

The locking mechanism disclosed in the '787 patent is effective in positively locking a shaft which is driven by a power source in a fixed rotational location to provide for maintenance on a mechanism driven by the shaft which should be held in a fixed position for purposes of safety or otherwise. However the mechanism of the '787 patent is mechanically complicated and is expensive to manufacture.

DISCLOSURE OF THE INVENTION

The present invention provides a mechanism for limiting the rotation of a rotatably mounted shaft against unrestricted rotation which is simpler, smaller and less expensive than the mechanism disclosed in U.S. Pat. 4,872,787. The mechanism provides for limiting the rotation of the shaft to control the positioning of a device driven by the shaft to facilitate operations such as maintenance while eliminating the possibility of a power source inadvertently being activated to drive the device which could result in injury to service personnel. The first shaft is limited to rotation through a fixed angle by a second shaft which is movable between a first axial position and a second axial position which engages the first shaft to prevent relative rotation between the shafts and causes grounding of at least one member attached to the second shaft against a surface of an inner cavity of a housing which rotatably supports the shafts. A lost motion mechanism permits rotation between the second shaft and the inner cavity which permits the alignment of a coupling mechanism carried by opposed ends of the first and second shafts.

The present invention is applicable to a wide range of applications, such as, but not limited to, controlling rotation of a shaft which is in the drive train disposed between the source of power and an acutator for folding wingtips of an airframe between horizontal and vertical positions where the second shaft, at least one member and an inner cavity of the housing are sufficiently strong to withstand the impact of torque transmitted from a power source to the first shaft. This prevents the inadvertent or uncontrolled application of power from the power source to a torque output driven by the first shaft when the second shaft engages the first shaft while minimizing the size and weight of the housing which is important in the operational efficiency of an airframe.

A mechanism for limiting rotation of a rotatably mounted first shaft in accordance with the invention includes a housing in which the first shaft is rotatably supported; a torque input coupled to the first shaft; a torque output coupled to the first shaft; a second shaft rotatably supported by the housing and movable between a first axial position in which the second shaft does not engage the first shaft and a second axial position in which the second shaft engages the first shaft; at least one member attached to the second shaft which projects radially from the second shaft; and the housing having an inner cavity with at least one surface which engages the at least one member at first and second angular positions of the second shaft to provide for a limited degree of relative angular rotation of the shaft when the second shaft is in the second axial position. The inner cavity has a major and minor axis with the major axis having a dimension greater than the minor axis; and two members are attached to the second shaft with the two members being diametrically opposed. Each member tapers as a function of increasing radius to define two pairs of parallel surfaces with a first pair of surfaces engaging the inner cavity at the first angular position along the parallel surfaces and a second pair of surfaces engaging the inner cavity at the second angular position along the parallel surfaces. The shaft engages the first shaft at the second axial position with a splined coupling which prevents relative angular rotation between the shafts and permits relative axial movement. The splined coupling comprises a bore contained on one end of the first and second shafts having a plurality of notches; and a plurality of teeth contained in another end of the first and second shafts with the teeth engaging the notches when the second shaft is at the second axial position. In accordance with the invention, an angle defined by the major axis of the inner cavity and one of the surfaces of the at least one member at engagement with the inner cavity equals 360°/n. Furthermore, a spring engages one of the shafts and the housing for biasing the second shaft in the first axial position; and a retainer holds the second shaft in the second axial position against a bias applied the spring. In a preferred application, the torque input is from a prime mover such as a hydraulic motor; and the torque output drives a wingtip actuator which moves a wingtip between a horizontal and a vertical position.

BEST MODE FOR CARRYING OUT THE INVENTION

Figure 1:
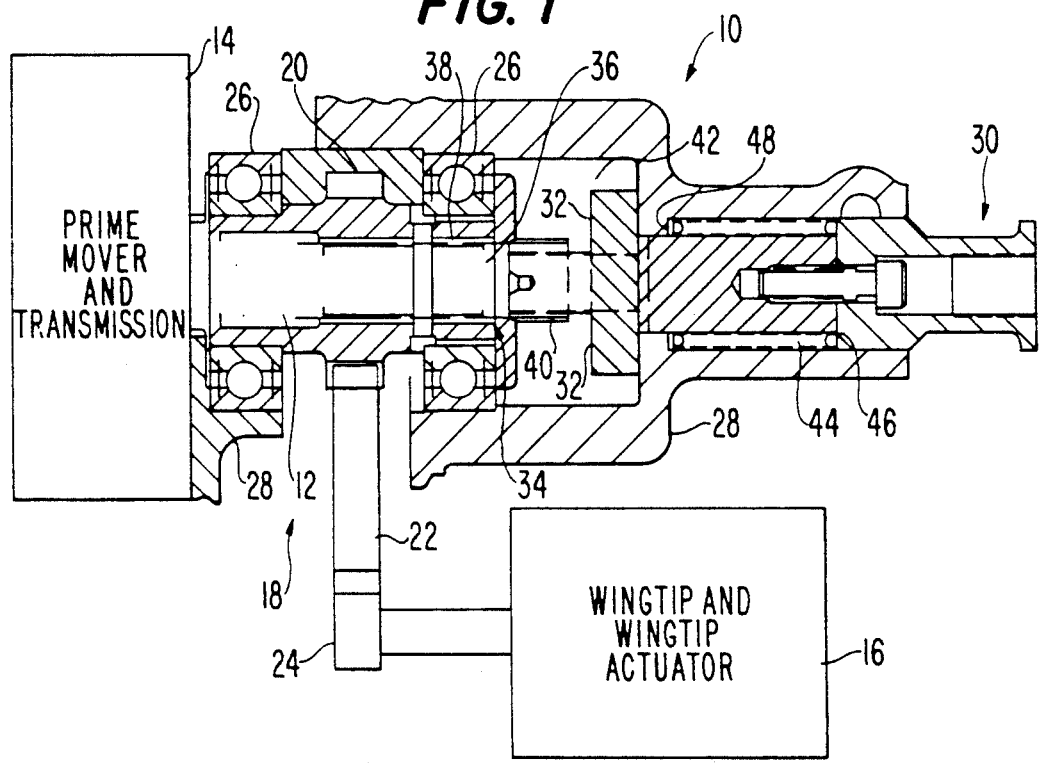
FIG. 1 illustrates a sectional view of a mechanism for limiting rotation of a rotatably mounted first shaft in which the first shaft is free to rotate.
Figure 2:
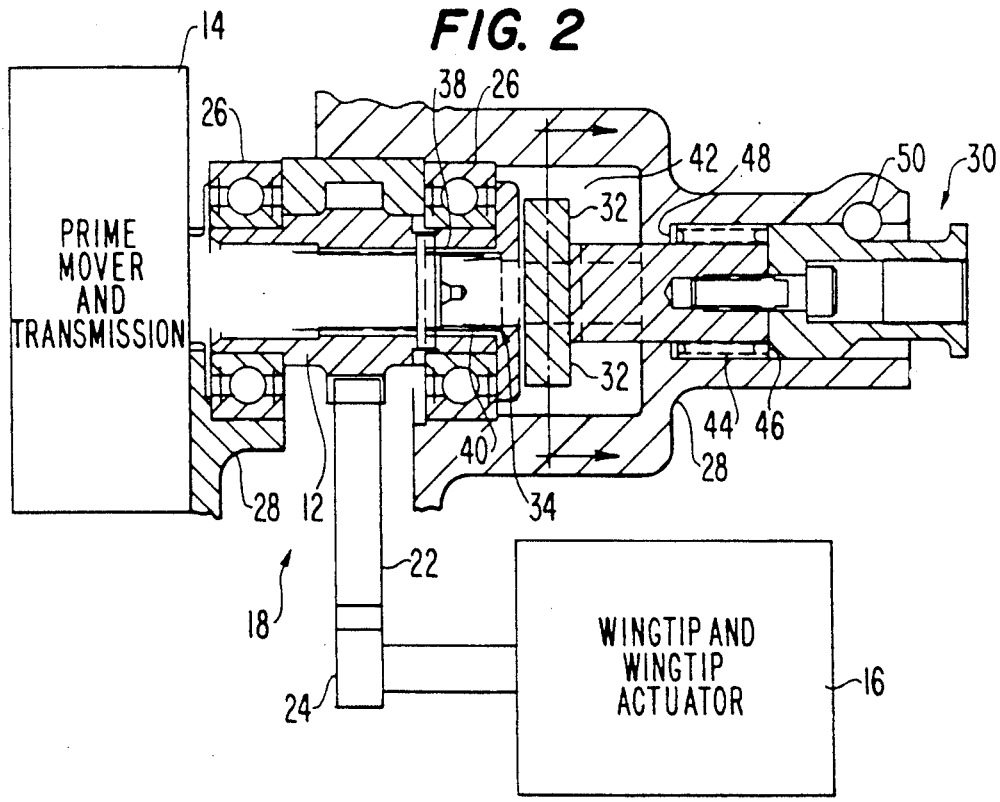
FIG. 2 illustrates a sectional view of the mechanism for limiting rotation of a rotatably mounted first shaft in which the first shaft is limited to rotation through a fixed angle by an inner cavity of the housing.

FIGS. 1 and 2 respectively illustrate a mechanism 10 for limiting rotation of a rotatably mounted first shaft 12 in which the first shaft is free to rotate and has a limited degree of rotation. The mechanism 10 for limiting rotation of the rotatably mounted first shaft 12 is contained in a system in which a prime mover and transmission 14 functions as a torque input to the first shaft 12 which drives a torque output which applies torque to a wingtip and wingtip actuator 16 of conventional construction such as those found on aircraft deployed on aircraft carriers. The prime mover and transmission 14 is of conventional construction and may be a hydraulic motor which drives a transmission containing a gear drive which is connected to the first shaft 12. The torque output 18 is comprised of a gear 20 which is mounted on the first shaft 12 which drives a second gear 22 which drives a third gear 24 which drives the wingtip and wingtip actuator 16. The gears 22 and 24 have been illustrated only schematically to simplify the illustration. The gearing contained in the torque output 18 is not limited to any particular drive mechanism with the gearing only being symbolic of possible implementation for coupling output torque from the first shaft to the wingtip and wingtip actuator 16. The first shaft is supported by a pair of bearings 26 which are retained in a housing 28 which is only partially illustrated. A second shaft 30 is rotatably supported in the housing 28 and is rotatable through a fixed angle of rotation between points of impact a pair of radially projecting members 32 which are diametrically mounted on the second shaft 30 and an inner cavity 42 in the housing as described below in conjunction with FIGS. 3-5. An end 34 of the first shaft 12 contains a bore 36 which contains a plurality of notches 38 which engage corresponding teeth 40 which are machined in an end of the second shaft 30 to provide a splined coupling which prevents relative angular rotation between the shafts 12 and 30 and permits relative axial movement between the shafts between a first position as illustrated in FIG. 1 and a second position as illustrated in FIG. 2. The second shaft 30 is limited to a fixed angle of rotation (lost motion) established by the clearance of the members 32 with respect to a surface of engagement defined by an inner cavity 42 as described below with reference to FIGS. 3-5. The second shaft 30 is biased by a spring 44 which engages a flared portion 46 of the second shaft and an inner shoulder 48 of the housing 28 into a first axial position as illustrated in FIG. 1. The spring 44 is compressed when the second shaft 30 is moved to a second axial position and locked in place by pin 50 as illustrated in FIG. 2.

The angle of relative rotation which is permitted between the radially projecting members 32 and the surface of engagement of the inner cavity 42 is preferably determined by the mathematical relationship 360°/n wherein n is the number of equally spaced teeth 40 machined on the end of the second shaft 30. It is necessary to provide at least the foregoing number of degrees of relative rotation between the first shaft 12 and the second shaft 30 to permit the teeth 40 of the end of the second shaft 30 to always be angularly positionable to engage the notches 38 within the bore 36 of the first shaft 12. A larger degree of angular rotation than that determined by the foregoing formula is not desirable as a consequence of providing greater impact on the members 32, surfaces of engagement of the inner cavity 42 of the housing 28 and on the coupling mechanism 34 between the first shaft 12 and the second shaft. When the prime mover is a hydraulic motor, the first shaft 12 may be accelerated to full rotational speed within a fraction of a single revolution of the hydraulic motor. As a result, it is important to limit the degree of relative rotation between the first shaft 12 and the second shaft 30 which is necessary to permit the coupling mechanism 34 to be engaged. Any greater degree of relative rotation than the minimum established by the foregoing formula is disadvantageous for the reason that higher shock loads will be applied to the foregoing elements when the shaft 12 is driven by prime movers having extremely high rates of acceleration such as hydraulic motors. The simplicity, minimum size and low cost of manufacture provided by the present invention is a result of providing a limited degree of angular rotation of the shafts between points of impact of the members 32 and the inner cavity 42 which is advantageous in applications where the components may be sized to withstand the impact loads which may be incurred by inadvertent starting of the prime mover 14.

Figure 3:
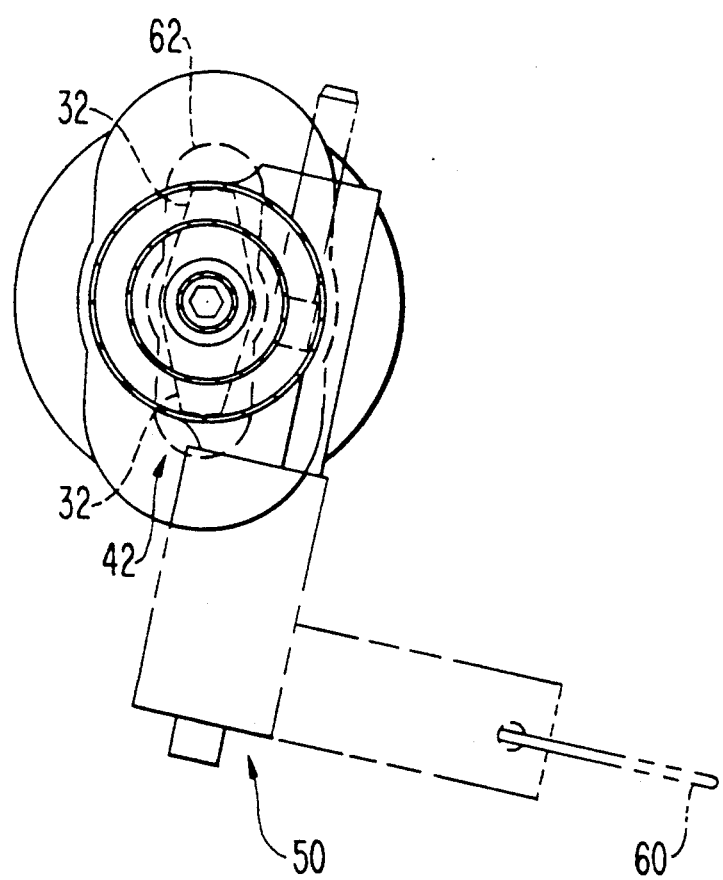
FIG. 3 is a sectional view of FIG. 2 illustrating the relationship between members attached to the second shaft and the inner cavity of the housing.

FIG. 3 illustrates in phantom the relationship between the locking pin 50 which may be a conventional pin used for military applications in which a warning sign is attached to loops 60 and the members 32 and the cross section 62 of the inner cavity 42. As illustrated, pin 50 holds the second shaft 30 in the second axial position in which the spring 44 is compressed as illustrated in FIG. 2.

Figure 4:
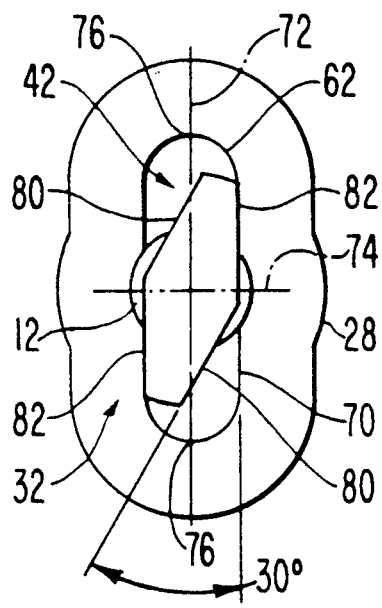
FIG. 4 illustrates a first angular orientation of the second shaft with respect to the inner cavity of the housing.

FIG. 4 illustrates a first angular orientation of a pair of members 32 with side walls 70 of the cross section 62 of the inner cavity 42. The cross section 62 has a major axis 72 and a minor axis 74. The distance between opposed point 76 measured along the major axis 72 is greater than the distance between opposed points (not illustrated) measured along the minor axis 74. The cross section 62 is generally elliptical although the invention is not limited thereto. Each of the members 32 tapers as a function of increasing radius to define two pairs of parallel surfaces with a first pair of surfaces 80 engaging the inner cavity 42 at a first angular position of the limited angular rotation permitted by the invention of the first and second shafts 12 and 30 along the parallel surfaces and a second pair of surfaces 82 engaging the inner cavity at a second angular position (illustrated in FIG. 5) along the parallel surfaces. An angle defined by the major axis 72 of one of the members 32 and one of the surfaces 80 and 82 of the engagement with the inner cavity 42 at one of the parallel surfaces 70 is equal to 360°/n wherein n is the number of teeth 40 carried by an end of one of the shafts 12 and 30 of the coupling mechanism 34. This angular relationship provides maximum contact surface area between the surfaces 80 and 82 and the parallel surfaces 70 of the cross section 62 of the inner cavity 42. When twelve teeth 40 are carried by an end of one of the shafts 12 and 30 of the coupling mechanism 34, the angle subtended between the major axis 72 and one of the surfaces 80 and 82 is equal to 30°.

Figure 5:
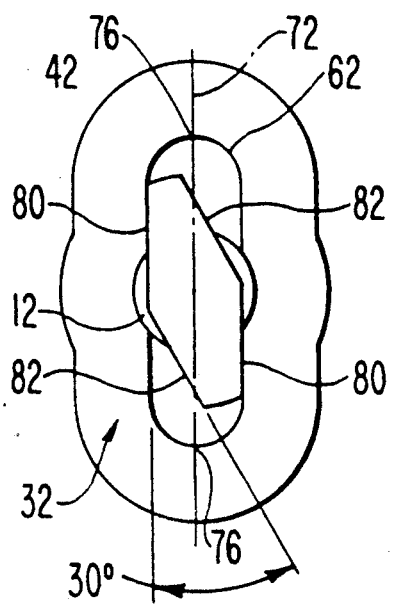
FIG. 5 illustrates a second angular orientation of the second shaft with respect to the inner cavity of the housing.

FIG. 5 illustrates a second angular position of the shafts 12 and 30 which is permitted by the clearance between the tapered members 32 and the side walls 70 of the cross section 62 of the inner cavity 42. Like reference numerals identify like parts in FIGS. 4 and 5. The shafts 12 and 30 are free to rotate between the first and second angular positions as illustrated in FIGS. 4 and 5 with the positions illustrated in FIGS. 4 and 5 establishing the limits of rotation with the angle of rotation of the shafts 12 and 30 subtended by the limits of rotation being determined by the foregoing formula.

While the invention has been described in terms of its preferred implementation, it should be understood that numerous modifications may be made thereto without departing from the spirit and scope of the invention as defined in the appended claims. For example, while a preferred application of the invention is for limiting rotation of a shaft which is contained in the power train coupling power from a power source to a wingtip and wingtip actuator 16, it should be understood that the invention may be used in diverse applications where it is desired to selectively provide free rotation of a shaft or a limited degree of rotation. Furthermore, while the coupling mechanism has been illustrated as a splined coupling which permits axial movement between the first shaft 12 and the second shaft 30 and restricts relative rotation therebetween, it should be understood that other coupling mechanisms may be used in practicing the invention. Furthermore, the configuration of the teeth 40 being carried by an end of the second shaft 30 and a bore being contained in the end of the first shaft 14 which contains notches for receiving the teeth may be reversed. It is intended that all such modifications fall within the scope of the appended claims.

We claim:

1. A mechanism for limiting rotation of a rotatably mounted first shaft comprising:
   a housing in which the first shaft is rotatably supported;
   a torque input coupled to the first shaft;
   a torque output coupled to the first shaft;
   a second shaft rotatably supported by the housing and movable between a first axial position in which the second shaft does not engage the first shaft and a second axial position in which the second shaft engages the first shaft;
   at least one member attached to the second shaft which projects radially from the second shaft; and
   the housing having an inner cavity with at least one surface which engages the at least one member which projects radially at first and second angular positions of the shafts to provide for a limited degree of angular rotation of the shafts when the second shaft is in the second axial position.

2. A mechanism in accordance with claim 1 wherein: the inner cavity has a major and minor axis with the major axis having a dimension greater than the minor axis; and
   two members are attached to the second shaft with the two members being diametrically opposed.

3. A mechanism in accordance with claim 2 wherein: each member tapers as a function of increasing radius to define two pairs of parallel surfaces with a first pair of surfaces engaging the inner cavity at the first angular position along the parallel surfaces and a second pair of surfaces engaging the inner cavity at the second angular position along the parallel surfaces.

4. A mechanism in accordance with claim 1 wherein: the second shaft engages the first shaft at the second axial position with a splined coupling which prevents relative angular rotation between the shafts and permits relative axial movement.

5. A mechanism in accordance with claim 4 wherein the splined coupling comprises:
   a bore contained in an end of the first and second shafts having a plurality of notches; and
   a plurality of teeth contained in another end of the first and second shafts with the teeth engaging the notches when the second shaft is at the second axial position.

6. A mechanism in accordance with claim 2 wherein: the second shaft engages the first shaft at the second axial position with a splined coupling which prevents relative angular rotation between the shafts and permits relative axial movement.

7. A mechanism in accordance with claim 6 wherein the splined coupling comprises:
   a bore contained in an end of the first and second shafts having a plurality of notches; and
   a plurality of teeth contained in another end of the first and second shafts with the teeth engaging the notches when the second shaft is at the second axial position.

8. A mechanism in accordance with claim 3 wherein: the second shaft engages the first shaft at the second axial position with a splined coupling which prevents relative angular rotation between the shafts and permits relative axial movement.

9. A mechanism in accordance with claim 5 wherein the splined coupling comprises:
   a bore contained in an end of the first and second shafts having a plurality of notches; and
   a plurality of teeth contained in another end of the first and second shafts with the teeth engaging the notches when the second shaft is at the second axial position.

10. A mechanism in accordance with claim 9 wherein:
    an angle defined by the major axis of the inner cavity and at least one member at engagement of the at least one member with the inner cavity in equal to 360°/n wherein n is the number of teeth.

11. A mechanism in accordance with claim 1 further comprising:
    a spring engaging one of the shafts and the housing for biasing the second shaft in the first axial position; and
    a retainer for holding the second shaft in the second axial position against a bias applied by the spring.

12. A mechanism in accordance with claim 2 further comprising:
    a spring engaging one of the shafts and the housing for biasing the second shaft in the first axial position; and a retainer for holding the second shaft in the second axial position against a bias applied by the spring.

13. A mechanism in accordance with claim 3 further comprising:
   a spring engaging one of the shafts and the housing for biasing the second shaft in the first axial position; and
   a retainer for holding the second shaft in the second axial position against a bias applied by the spring.

14. A mechanism in accordance with claim 4 further comprising:
   a spring engaging one of the shafts and the housing for biasing the second shaft in the first axial position; and
   a retainer for holding the second shaft in the second axial position against a bias applied by the spring.

15. A mechanism in accordance with claim 5 further comprising:
   a spring engaging one of the shafts and the housing for biasing the second shaft in the first axial position; and
   a retainer for holding the second shaft in the second axial position against a bias applied by the spring.

16. A mechanism in accordance with claim 6 further comprising:
   a spring engaging one of the shafts and the housing for biasing the second shaft in the first axial position; and
   a retainer for holding the second shaft in the second axial position against a bias applied by the spring.

17. A mechanism in accordance with claim 7 further comprising:
   a spring engaging one of the shafts and the housing for biasing the second shaft in the first axial position; and
   a retainer for holding the second shaft in the second axial position against a bias applied by the spring.

18. A mechanism in accordance with claim 8 further comprising:
   a spring engaging one of the shafts and the housing for biasing the second shaft in the first axial position; and
   a retainer for holding the second shaft in the second axial position against a bias applied by the spring.

19. A mechanism in accordance with claim 9 further comprising:
   a spring engaging one of the shafts and the housing for biasing the second shaft in the first axial position; and
   a retainer for holding the second shaft in the second axial position against a bias applied by the spring.

20. A mechanism in accordance with claim 10 further comprising:
   a spring engaging one of the shafts and the housing for biasing the second shaft in the first axial position; and
   a retainer for holding the second shaft in the second axial position against a bias applied by the spring.

21. A mechanism in accordance with claim 1 wherein:
   the torque input is from a prime mover; and
   the torque output drives a wingtip actuator which moves a wingtip between a horizontal and a vertical position.

22. A mechanism in accordance with claim 2 wherein:
   the torque input is from a prime mover; and
   the torque output drives a wingtip actuator which moves a wingtip between a horizontal and a vertical position.

23. A mechanism in accordance with claim 3 wherein:
   the torque input is from a prime mover; and
   the torque output drives a wingtip actuator which moves a wingtip between a horizontal and a vertical position.

24. A mechanism in accordance with claim 4 wherein:
   the torque input is from a prime mover; and
   the torque output drives a wingtip acutator which moves a wingtip between a horizontal and a vertical position.

25. A mechanism in accordance with claim 5 wherein:
   the torque input is from a prime mover; and
   the torque output drives a wingtip actuator which moves a wingtip between a horizontal and a vertical position.

26. A mechanism in accordance with claim 6 wherein:
   the torque input is from a prime mover; and
   the torque output drives a wingtip actuator which moves a wingtip between a horizontal and a vertical position.

27. A mechanism in accordance with claim 7 wherein:
   the torque input is from a prime mover; and
   the torque output drives a wingtip actuator which moves a wingtip between a horizontal and a vertical position.

28. A mechanism in accordance with claim 8 wherein:
   the torque input is from a prime mover; and
   the torque output drives a wingtip actuator which moves a wingtip between a horizontal and a vertical position.

29. A mechanism in accordance with claim 9 wherein:
   the torque input is from a prime mover; and
   the torque output drives a wingtip actuator which moves a wingtip between a horizontal and a vertical position.

30. A mechanism in accordance with claim 10 wherein:
   the torque input is from a prime mover; and
   the torque output drives a wingtip actuator which moves a wingtip between a horizontal and a vertical position.

* * * * *